April 12, 1955 W. C. HACKMAN 2,706,240
FLASH TYPE STEAM GENERATORS
Filed Aug. 12, 1952 3 Sheets-Sheet 1
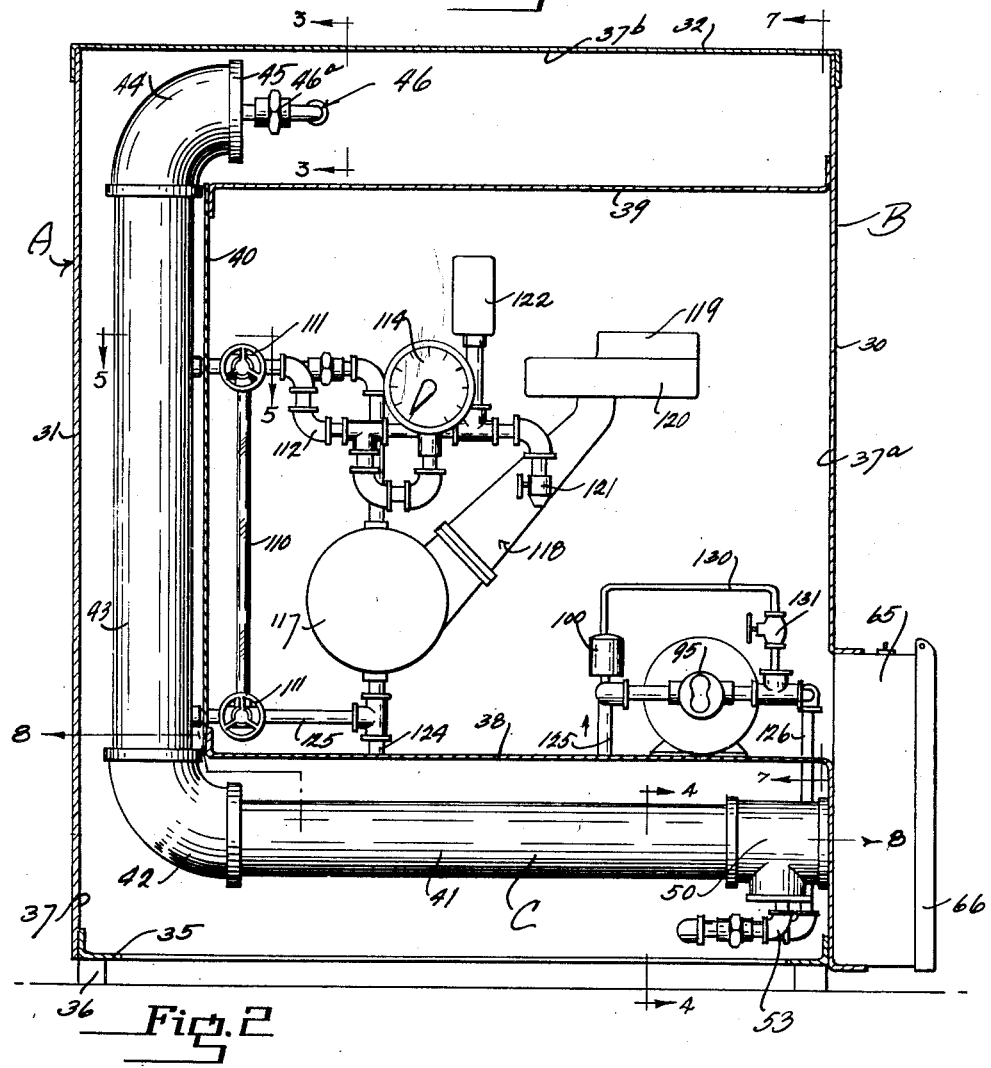
INVENTOR
William C. Hackman
BY
ATTORNEYS April 12, 1955 W. C. HACKMAN 2,706,240
FLASH TYPE STEAM GENERATORS
Filed Aug. 12, 1952 3 Sheets-Sheet 2
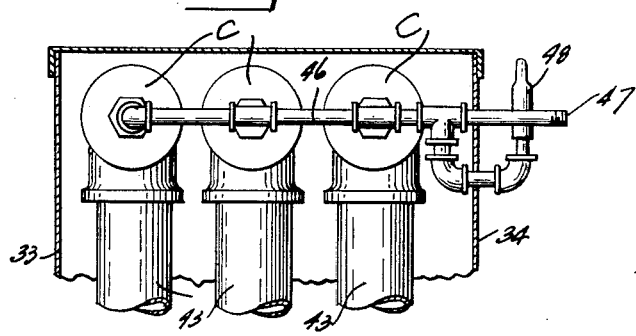
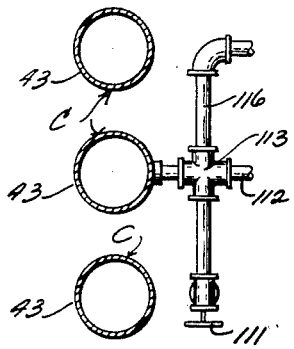
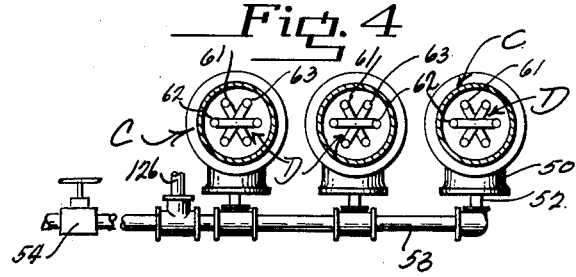
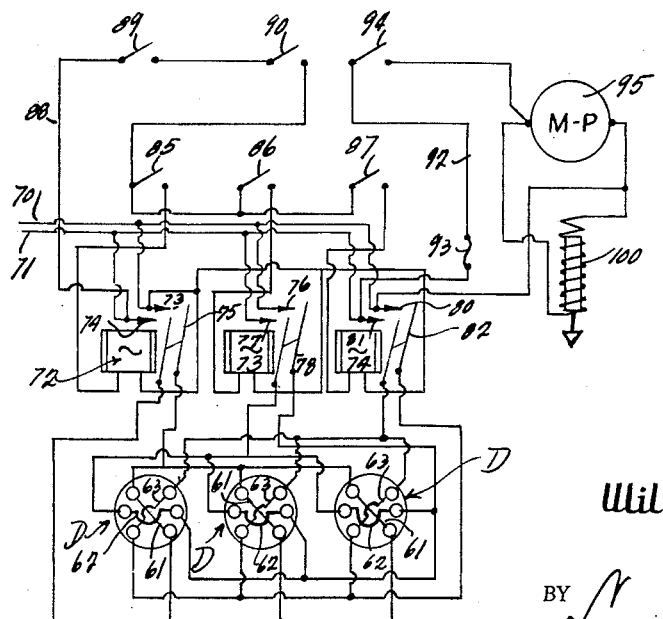
INVENTOR
William C. Hackman
BY Lancaster, Allwine & Rommel
ATTORNEYS

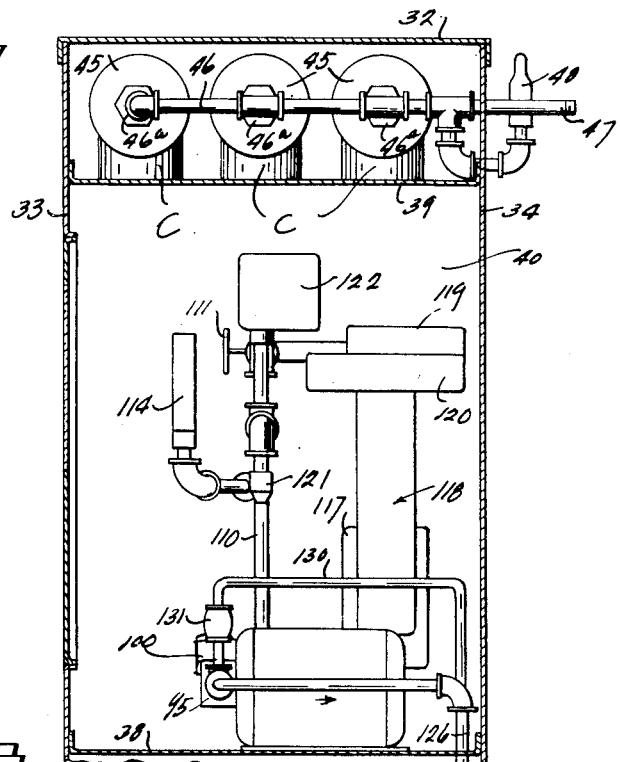
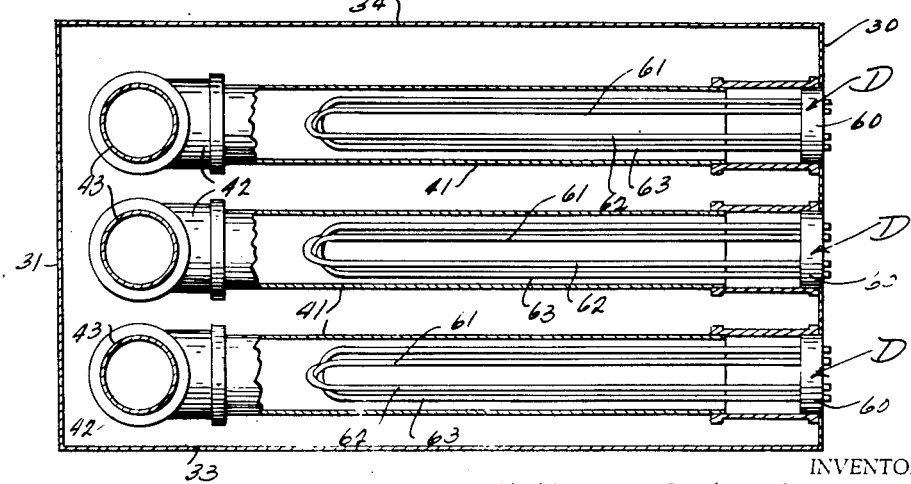

United States Patent Office 2,706,240
Patented Apr. 12, 1955

2,706,240

FLASH TYPE STEAM GENERATORS

William C. Hackman, Silver Spring, Md., assignor to Electric Steam Cleaner Manufacturing Corporation, Silver Spring, Md., a corporation of Maryland Application August 12, 1952, Serial No. 303,974

7 Claims. (Cl. 219—38)

This invention relates to improvements in steam generators.

The primary object of this invention is the provision of a relatively compact and preferably portable type of steam generator embodying a plurality of units for the uniform flash generation of steam.

A further object of this invention is the provision of an improved steam generator wherein improved electrical resistance units are provided as the heating means for the uniformly balanced flash generation of steam.

A further object of this invention is the provision of an improved type of steam generator including a plurality of flash tubes each including a heating unit having a plurality of electrical resistance units placed for selected operation in order to provide for automatically controlled steam generation.

A further object of this invention is the provision of an improved steam generator including a plurality of flash steam generating units, each of which includes a heating unit, the temperature of which may be varied selectively under such conditions that the same temperature for steam generation exists in each unit for the automatic balanced generation of steam.

A further object of this invention is the provision of a flash type steam generator embodying improved safety means for the flash generation of steam under such circumstances that the steam output can be accurately regulated under predetermined existing conditions.

A further object of this invention is the provision of an improved electrical control system for electrically heated steam generators.

A further object of this invention is the provision of an improved portable type steam generator having some of the characteristics of the steam generator of my U. S. Patent 2,627,015, dated January 27, 1953, but differing thereover in the provision of means to enable flash generation of steam, with improved control means associated therewith.

Other objects and advantages of this invention will be apparent during the course of the following detailed description.

In the drawings, wherein similar reference characters designate corresponding parts throughout the several views:

Fig. 1 is a vertical cross sectional view taken through the improved steam generator.

Fig. 2 is a side elevation of the steam generator.

Fig. 3 is a fragmentary cross sectional view taken substantially on the line 3—3 of Fig. 1, showing the steam header end of the generators.

Fig. 4 is a fragmentary cross sectional view taken through the lower or water inlet end of the generators, substantially on the line 4—4 of Fig. 1, showing therein the water inlet header through which the water circulates to the steam generators, and also showing the different elements of the heating units.

Fig. 5 is a fragmentary cross sectional view taken substantially on the line 5—5 of Fig. 1.

Fig. 6 is a diagrammatic view showing the various parts of the steam generator and also the wiring circuits.

Fig. 7 is a fragmentary vertical cross sectional view taken through the steam generator substantially on the line 7—7 of Fig. 1.

Fig. 8 is a cross sectional view, taken substantially on the line 8—8 of Fig. 1, showing the lower portions of the steam generators and the electrical heating units.

In the accompanying drawings, forming a part of this specification, and wherein is shown only a preferred embodiment of the invention, the letter A may generally designate the steam generator. It includes a frame or casing supporting structure B having a plurality of steam generating tubes C, of any desired number connected in complementary relation for the balanced generation of steam. Each of the flash tubes C is provided with an electrical heating unit D.

The frame structure B may vary in structure. In the present instance it may include a plurality of walls or other members so connected together as to provide for portability and compactness. It preferably includes front and rear walls 30 and 31, a top wall 32, and side walls 33 and 34. The walls may be mounted upon angle pieces 35 as by welding. The angle pieces 35 may have a supporting foundation or base structure 36. This may be a portable carriage if so desired. In appearance the casing frame structure B is rectangular and provides a chamber 37 wherein the flash tubes C are disposed. The interior of the compartment 37 may be further subdivided by means of intermediate lower and upper horizontal walls 38 and 39, spaced in parallelism with respect to the frame angle pieces 35 and the top wall 32, and also a rear wall 40 may be spaced from the rear wall 31, as shown in Fig. 1. These walls 38, 39 and 40, together with the front wall 30 define an instrument receiving compartment 37ª.

The flash units C are preferably tubular and constructed of steel. Each of the same includes a lower horizontal length 41 connected by means of a 90° tube turn or elbow 42 with a vertical tubular section 43. Each flash tube furthermore includes a top 90° turn elbow 44, to the vertical face plate 45 of which is connected a steam header 46. The turns or any part of the steam generating units C may be constructed of forged steel, if found necessary.

The elongated tube portions 41 and 43 respectively parallel the base flanges 35 and the wall 31 and are located immediately adjacent to but outside of the walls 38 and 40. The header 46 is located in a compartment 37ᵇ between the top wall 32 and the wall 39, as shown in Fig. 1. Each tube turn 44 has a connection 46ª with the header 46. The header 46 has a steam outlet 47 externally of the casing wall 34 and also has a safety valve 48 as shown in Fig. 3.

The lower lengths 41 of the flash tubes C extend to the front wall 30 and are there provided with T's 50 opening externally upon the wall 30 for receiving electric heating units D. The T connections 50 are shown in Fig. 4 and each has a reduced pipe connection 52 opening into an inlet water header 63; a blow off valve 54 being provided on this header, externally of the casing, as shown in Fig. 4. The water enters the horizontal lower portion 41 of the flash tubes from the circulating inlet header 53 and travels along said tube portions 41 parallel with and along the heating units D, for the flash conversion of the same into steam.

The electrical heater units D are all of the same construction, and it is a prime object of this invention to provide each of them with a plurality of separate selectively usable resistance elements. To that end, each unit D preferably includes a mounting plate 60, disposed in the inlet end of the T 50, as shown in Fig. 8, and upon which are mounted, in relatively insulated relation, three resistance elements 61, 62 and 63. These elements 61, 62 and 63 are U-shaped in formation, and extend parallel to and along and within the compartments of the flash tube portions 41, extending to a point short of but adjacent to the tube turn 42, where the bight ends of said elements are located. The free ends within the mounting plate 60 are connected in an electric circuit, as shown in the wiring diagram of Fig. 6, as will be subsequently described.

The wall 30 is provided with a casing structure 65, having a closure 66 connected thereon. This casing receives therein the various relays, heating element contacts, controls and wires.

Referring to the wiring diagram of Fig. 6, power service lines 70 and 71 have two pole electromagnetic relays 72, 73 and 74 connected therein. They control flow of current to the heating elements in the flash tubes C. Wires lead off from the service lines 70 and 71 for the relay 72 and terminate in contacts 73 and 74. They may be bridged by the two pole switch armature 75 for flow of current to the heating element 61 of each of the heating units D. That is, when the electromagnetic switch 72 is closed the heating element 61 in each of the electric heater units D will be ignited to produce flash steam in each of the three flash tubes. In like manner the power lines 70 and 71 are connected by suitable wires to contacts 76 and 77 of the electromagnetic switch 73. When the armature 78 thereof bridges the contacts 76 and 77, the heating element 62 of each of the heater units D in each flash tube C will be ignited or set into operation for the flash generation of steam. Also, the electromagnetic relay 74 has a pair of contacts 80 and 81 in the power line circuit 70—71 and when the two pole armature switch 82 bridges them the other heating element 63 of each of the heater units D will be set in operation for supplying additional heat to each flash tube for steam generating purposes.

In the electric circuit for the electromagnetic switches 72, 73 and 74 there are respectively disposed manually actuated toggle switches 85, 86 and 87, arranged in the circuit so that they may be closed to enable current from the lines 70 and 71 to enter the coils of the respective electromagnetic switches 72, 73 and 74. It should also be noted that in the portion 88 of the wiring circuit, including the switches 85, 86 and 87, are also located a pressurestat switch 89 and a low water cutoff switch 90. If the switches 89 and 90 are opened, current will not flow to the electromagnetic switches 72, 73 or 74 through the manually operated switches 85, 86 and 87, even though the latter individually or in combination are closed. In a portion 92 of the circuit there is disposed a fuse 93 and a water float actuated motor-pump control switch 94. The switches 90 and 94 are mercury switches. A solenoid type electromagnetically actuated valve 100 is disposed in the portion 92 of the circuit to enable water to enter the circulating header 53 when the pump is operating.

Tapped in the vertical portion 43 of one of the flash generators C is a water level gauge 110, having the usual top and bottom valves 111. Only the central tube 43 need be so connected, since the level of the water in all the flash tubes is the same, due to their interconnection by means of the feed header 53. In a line connection 112 with the water gauge union 113 there is disposed a pressure gauge 114. It is externally visible through a window 115 in the side wall 33 of the casing structure. Leading off from the union 113 is another pipe line 116 including a vertical portion connected to the float chamber portion 117 of a water level control and cutoff structure 118. In portion 119 is located the low water cutoff mercury switch 90 and in the portion 120 is located the pump control mercury switch 94; these switches being diagrammatically shown in Fig. 6 in the wiring circuit and float operated in a manner well known in the art. The line connection 112 may furthermore include a valved blow off 121 and also a housing structure 122 wherein the pressurestat switch 89 is disposed. The float portion 117 of the control shown in Fig. 1 may have a lower pipe connection 124 with a valved outlet (not shown) therebelow; this line 124 being connected at 125 with the vertical tube portion 43 at the level of the bottom of the water level gauge 110.

The water inlet pipe 125 extends to the motor-pump 95. Therein is located the electromagnetic or solenoid type valve 100. At the discharge side of the pump a line 126 leads to the inlet header 53, as shown in Figs. 1 and 4 of the drawings. A bypass line 130 extends from the inlet line 125 direct to the discharge side of the pump, and in it there is located a valve 131. Thus water may be bypassed directly from the inlet line 125 into the water inlet header 53, should circumstances require.

The operation of the circuit and the various devices will be apparent from the foregoing. The entire system is automatic and all that it is necessary for the operator to do, after the main water inlet valve has been opened, is to close one or more of the toggle switches 85, 86 and 87. Each of them control heating elements in each of the flash units C. Any two of them will operate two heating elements in each of the flash units and if all three toggle switches are closed the heating units D are in full operation.

The pump control mercury switch 94 preferably closes slightly ahead of the low water cutoff switch 90. The pressurestat switch 89 will open due to the existence of pressure above predetermined amount in the flash tubes. Since all tubes are interconnected there will exist a balanced condition of water and steam pressure therein. Of course upon the occurrence of low water, switch 90 will open to cut out the heating elements. The toggle switches 85, 86, 87 and some of the other controls may be appropriately placed upon a removable panel (not shown) within the compartment 37a, or at any other suitable location desired. Also, an auxiliary tank indicated at 130a in Fig. 2 may be detachably clipped or otherwise supported upon the rear wall structure 31 for containing a detergent. The latter may be fed into the steam line by any suitable means (not shown); thus adapting the steam generator for such cleaning use if desired.

Additional tubes C and heaters D may be added to the generator without requiring additional control elements.

The compartments surrounding the flash tubes C may be packed with insulation if so desired.

In operation the water level in the flash tube rises to above the float in the part 117 of the control. As soon as the heater units are turned on the water, due to the small volume of the portions 41 of the tubes, is instantly flashed into steam; the water having a tendency then to rise in the portions 43 of the tubes.

It is within the scope of this invention to utilize any desired number of the flash tubes, and various changes in the shape, size and arrangement of parts may be made with the invention as herein described, without departing from the spirit thereof or the scope of the claims.

I claim:

1. In a steam generating device the combination of a plurality of steam generators, electric heating units for each of the generators, each electric heating unit including a plurality of heating elements, an electric system connecting said heating elements of all of the heating units together with selective means for actuating one or more of the heating elements in said generators, interconnecting means connected with said steam generators for withdrawal of steam, interconnecting water supply means connected with said steam generators for supplying the same amount of water to each of the same, motor actuated pump means for supplying water to the water supply means, an electromagnetically actuated valve for controlling the supply of water to said pump, an electric circuit wherein is located the pump motor, a low water cut-off swtich means in said electric circuit for the pump motor, and a water level actuated pump control switch means in said electric circuit.

2. In an electric system for the generation of steam in a plurality of steam generating units the combination of electrical heating units for each of the steam generating units, each heating unit including a plurality of independent resistance type heating elements, power service lines, a plurality of electromagnetically actuated switches connected in circuit with the service lines each arranged for throwing into operation one heating element of each heating unit in each of the steam generators, and manually controlled switch means connected in the circuits with the electromagnetically actuated switches for operating the latter selectively.

3. In a steam generator the combination of a supporting framework having mounted thereon a plurality of flash type steam generators, means interconnecting said steam generators for receiving steam therefrom for outlet to a common location, a water inlet header interconnecting said steam generators for the uniform quantity and level supply of water thereto, electric heating units for each of the generators, each heating unit including a plurality of resistance type heating elements, and an electric system connecting said heating elements together so that the same number of heating elements in each of the tubes may be selectively placed in operation at the same time.

4. In a flash type steam generating system the combination of a plurality of flash type steam generator units, means interconnecting said units so a balanced condition of steam pressure and water level exists in said units, electric heaters in each of said units, each heater of each unit including a plurality of heating elements, an electric system connecting said heating elements of the heating units together including a plurality of electromagnetic switches for controlling the supply of current to said heating units, each electromagnetic switch including an electric connection to less than the entire number of heating elements of each heating unit, and control switch means for actuating said electromagnetic switches for closing circuits through said heating elements.

5. In a steam generating system the combination of a plurality of steam generators of L-shaped formation each including a lower tubular portion and an upstanding tubular portion with chambers communicating with each other, a common steam header connected to the upper ends of the upstanding portions, a common water inlet header connected to the free outer ends of the lower horizontal portions, electric heaters in the lower portions of each of said steam generators, an electric system for supply of electrical energy to said heaters including manually actuated switch means for the system, a lower water cutoff switch, a motor pump means for pumping water through said header into said steam generators, a pump control switch means, and means operatively connecting the low water cutoff switch and pump control switch means with the lower portions of the upstanding parts of said steam generators.

6. A steam generating system as described in claim 5 wherein a bypass means is provided for bypassing a supply of water around said pump means into the water inlet header, and electromagnetically controlled valve means for controlling the supply of water to said pump.

7. In a steam generating system the combination of a plurality of flash type steam generator units each of which is of L-shaped formation, and each of which includes a horizontal tubular portion and an upstanding tubular portion, said tubular portions of each unit having communicating chambers, a common steam header connected to the upper ends of the upstanding portions for receiving steam from each of said units, common water inlet means at the outermost ends of the horizontal portions of the steam generator units having means for balanced pressure and quantity supply of water to each of said units, electric heating means in each of the horizontal portions for each of said units for the generation of steam therein, each of said electric heating means including a plurality of independent electric heating elements, and control means for maintaining the heating intensity of each of said heating means at the same degree in the said generator units, said control means including means to selectively vary said heating intensity, through the independent heating elements, to the same degree in each of said heating means.

References Cited in the file of this patent

UNITED STATES PATENTS

| | | |
|---|---|---|
| 838,885 | McElroy | Dec. 18, 1906 |
| 1,580,293 | Fitzer | Apr. 13, 1926 |
| 1,583,961 | Crowell | May 11, 1926 |
| 1,599,544 | Reed | Sept. 14, 1926 |
| 1,787,450 | Lonergan | Jan. 6, 1931 |
| 2,458,103 | Schwartz | Jan. 4, 1949 |
| 2,623,153 | McGinnis | Dec. 23, 1952 |
| 2,627,015 | Hackman | Jan. 27, 1953 |